May 12, 1936.   B. W. TWYMAN   2,040,347
MEANS FOR FINISHING HELICAL FORMS
Filed Sept. 29, 1934
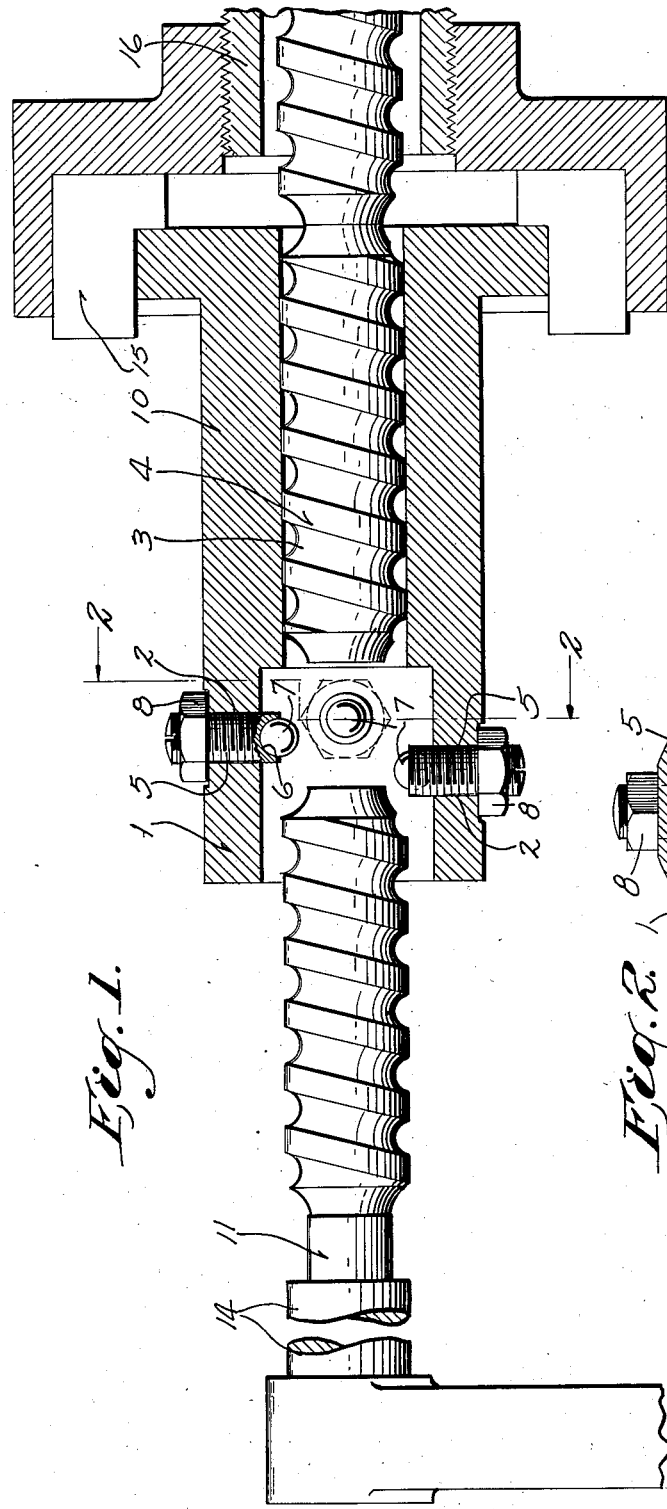
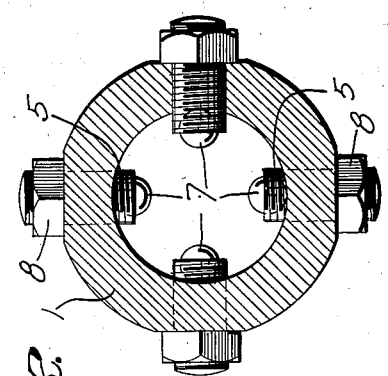
INVENTOR
B. Wickliffe Twyman
BY
Wheler, Wheler and Wheler
ATTORNEYS Patented May 12, 1936

2,040,347

UNITED STATES PATENT OFFICE 2,040,347

MEANS FOR FINISHING HELICAL FORMS

B. Wickliffe Twyman, Milwaukee, Wis., assignor to Lavine Gear Company, Milwaukee, Wis., a corporation of Wisconsin Application September 29, 1934, Serial No. 746,029

4 Claims. (Cl. 29—90)

This invention relates to means and methods for manufacturing worm cams and screws.

It is the primary object of this invention to provide a substantially frictionless burnished threadway in a worm cam or the like by a new and improved burnishing method in which a piece of screw threaded shafting is properly piloted and driven axially through a series of adjustably mounted balls, each of which are successively mounted in a gradually decreasing radius measured from the axis of the thread being burnished, so that the last ball in the series will give the finished and burnished thread the suitable working clearance essential to its further commercial use as an article of manufacture.

It is a still further object of this invention to provide a manufacturing process and tool for the production of such worm cams, screws and the like, which shall be both simple and economical whether used in quantity production or for small amounts.

In the drawing:

Figure 1 is a vertical cross section through the thread burnishing device.

Figure 2 is a longitudinal cross sectional view taken on the line 2—2 of Figure 1.

Like parts are identified by the same reference characters throughout the several views.

This application is a companion to my application Serial No. 717,177.

In Fig. 1 the apertured burnishing housing comprises a rigid nut fitting 1 having a series of radially disposed threaded apertures 2 corresponding to the pitch of the thread 3 on the worm cam 4 movable therethrough. A series of adjustable screw threaded bolts 5 have sockets 6 on their inner ends into which burnishing balls 7 are forced with a pressed fit. These bolts are screwed into the threaded apertures 2 of the housing 1. The adjustment is such that balls 7 are successively mounted at a gradually decreasing radius measured from the axis of the thread 3 of the cam 4. Lock nuts 8 upon the outer ends of the bolts 5 facilitate the adjustments of the ball tools 7. Ball tools 7 are used in the thread finishing process because they fit the particular thread and are economical and easily replaceable in the sockets 6. For other purposes any other form of hardened tool might be made integral with, or to be mounted in the adjusting bolts 5.

A cylindrically bored pilot housing 10 serves as a guide for the worm cam 4 which it preferably (but not necessarily) engages after the cam is fed axially past the balls 7. The work (worm cam 4) and the tool fitting (the burnishing device) may be moved with reference to each other in any one of a number of ways. For example, the burnishing device may be set with its axis upright and a worm cam blank of any desired length, with previously roughly machined thread, may be impelled, as by a drill press, by axial pressure through the burnisher to finish the thread. Preferably, however, each finished length of worm cam is provided with an internal bore and a longitudinally extending groove and is splined to a quill 11 such as may be mounted conveniently in a slide 14 of a screw machine.

The quill 11, in this organization, is held stationary, and the guide fitting 10 and nut 1 are rotated in the chuck 15 of a screw machine spindle 16 which is tubular. Each blank is thereby screwed into and through the burnishing appliance so that the rough thread initially formed on the blank will be finished and burnished by the ball tools 7, and each blank in turn pushes its predecessor out through the hollow spindle. It is therefore immaterial whether the work and the tool be moved with reference to each other under axial pressure or rotative pressure. It has been found convenient, however, to rotate the nut as last outlined above and shown in the drawing.

The preferred method of manufacture is as follows:

A piece of shafting of proper dimensions is bored and a keyway broached therein in the conventional manner. The stock is then placed on a bolt cutter, usually on an arbor, and the threads are roughly cut, after which the worm cams are trimmed to finished length and bearing surfaces are cut in either end. The cam is then splined to a quill held stationary on a multiple turret lathe or screw machine and driven axially or screwed through the burnishing tool. At the completion of this operation the cam is thoroughly burnished. The rough thread might, for example, have the identical arc of the ball or complementary thread which is ultimately to be used in mesh therewith. In the burnishing operation each successive burnishing ball will be thrust slightly more deeply into the material of the blank so that the completed thread will not only be burnished but will provide the proper clearance or deliverance. The effect of the burnishing operation is to leave the thread fully as well finished as if it had been subjected to the most expensive polishing, but the cost is only a fraction of that required for a polishing operation.

I claim:

1. A thread burnishing device comprising the combination with a sleeve guide for a rough threaded worm cam blank, of a series of ball tools positioned in the path of a worm cam advancing beyond said blank and respectively offset on a pitch corresponding to the rough thread thereof, and means supporting said ball tools at successively decreasing radial distances from the axis upon which said blank moves beyond said guide, whereby said tools will be successively effective in burnishing and enlarging the thread of the blank.

2. A thread burnishing device comprising a set of balls positioned on a helical path corresponding in pitch to the thread to be burnished at progressively decreasing radial distances from the axis of such path, and means supporting said balls in the positions aforesaid.

3. A thread burnishing device comprising a set of balls positioned on a helical path corresponding in pitch to the thread to be burnished at progressively decreasing radial distances from the axis of such path, and means supporting said balls in the positions aforesaid, said means comprising an annular support and a plurality of individual ball supports independently adjustable radially in said annular support.

4. In a thread burnishing device, the combination with a support, of a set of burnishing tools projecting from the support in the direction of the threads to be burnished, said tools being circumferentially spaced about the support and axially spaced from each other in positions to act successively upon the work, each of such tools being engageable with a single thread and each being substantially circular in cross section whereby to be smoothly rounded in the directions of engaging and leaving all the surface portions of the work traversed thereby.

B. WICKLIFFE TWYMAN.